(No Model.)
W. J. LANE.
STAY ROLLER.
No. 350,751. Patented Oct. 12, 1886.
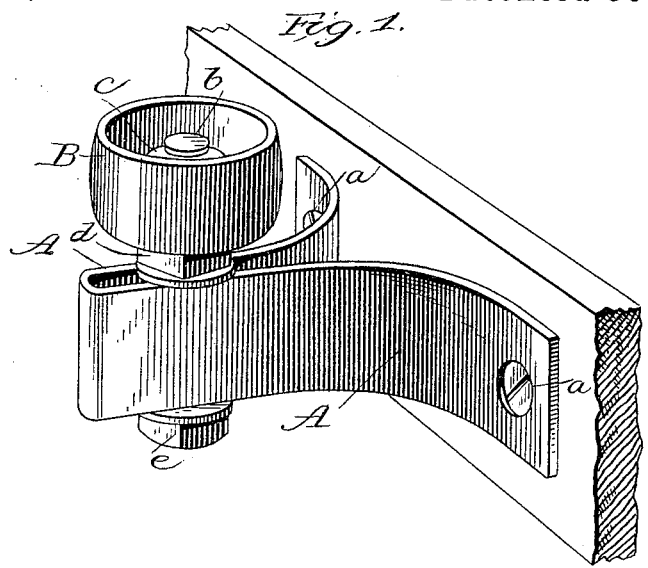
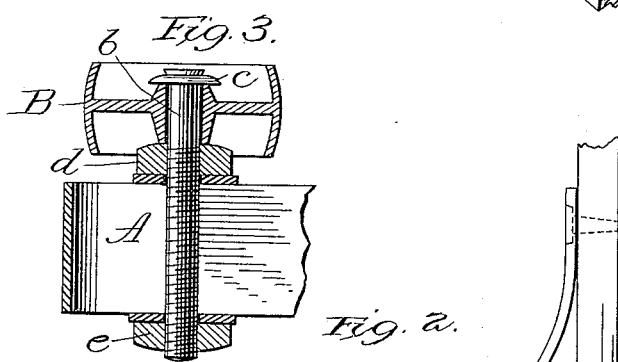
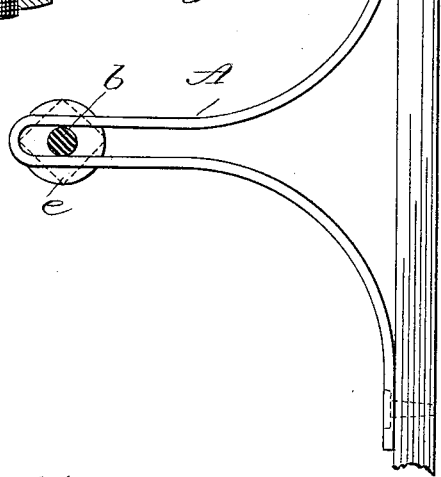
Attest:
Walter Donaldson
F. L. Middleton
Inventor
Wm J. Lane
by Joyce & Spear
Attys.

UNITED STATES PATENT OFFICE.

WILLIAM J. LANE, OF POUGHKEEPSIE, NEW YORK.

STAY-ROLLER.

SPECIFICATION forming part of Letters Patent No. 350,751, dated October 12, 1886.

Application filed December 10, 1885. Serial No. 185,270. (No model.)

*To all whom it may concern:*

Be it known that I, WILLIAM J. LANE, of Poughkeepsie, in the county of Dutchess and State of New York, have invented a new and useful Improvement in Stay-Rollers; and I do hereby declare that the following is a full, clear, and exact description of the same.

My invention is an improved stay-roller for use in connection with sliding doors, and for similar purposes. It is desirable that such rollers should be light and strong, that they should be easily adjusted to suit different situations, that they should not be liable to derangement, and that they should not be expensive to make. I have sought to attain all these objects by forming the bracket or roller support out of a single piece of strap metal bent to form a slot for the roller-bolt, which is clamped thereto by nuts on the said bolt bearing on the edges of the bracket-arms in any position within the limits of the slot. Stay-rollers of this class have heretofore been made of strap metal bolted to a slotted block forming the roller-bolt, the block being thus made adjustable by means of the slots. A bracket has also been made of two pieces of strap metal joined to each other, like the parts of a common strap-hinge, the roller-bolt forming the pivoting-pin of the hinged parts. In this the roller is adjusted by spreading the legs of the bracket, which interferes with the fit of the bracket to its support. My invention differs from these, on the one hand, in avoiding the use of the block, and, on the other, the expense of the hinge and lack of fit of the bracket.

In the accompanying drawings, Figure 1 is a perspective view of my invention. Fig. 2 is a view of the bracket with the bolt in place, and in transverse section. Fig. 3 is a section taken longitudinally along the bolt.

In the drawings, A represents the bracket which supports the roller. It is made of a steel strap, which may be one and a half inch wide by three thirty-seconds of an inch in thickness. This is bent at the center, and the two sides or arms are brought into position parallel with each other, the parallel sides extending one and a half inch (more or less) from the bend. Thence the arms spread, preferably on a circular curve, and the ends terminate in a plane at right angles, or approximately so, to the planes of the parallel sides. Holes *a* are made in the ends to receive the screws by which the bracket is fixed in place. The bolt *b* is formed with a button-head, *c*, and is threaded to receive nuts *d* and *e*. The bolt is passed through the hole in the center of the roller B, and the nut *d* is turned on the bolt to position shown, so as to bring the stay-roller at proper distance from the bracket. The bolt is then inserted between the parallel sides of the bracket, and the nut *e* turned on to bear firmly against the edges of the parallel sides. The bolt is therefore held by frictional contact of the nuts against the edges of the sides, and may be placed at any point on these parallel parts without change in the bracket.

A collar or shoulder may be substituted for the nut *d*, and washers may be interposed, if desired, between the nuts and their bearings.

In order to adjust the roller, it is necessary only to slacken the nut *e* and slide the bolt out or in and then tighten the nut.

It will be obvious that the bracket may be made of metal cylindrical or square in cross-section, instead of the rectangular shape shown.

I am aware that prior to my invention a wrought-iron strap has been used as a support for a stay-roller, having a clamping-circle at one end and diverging arms for attachment, and I do not claim such as my invention.

I am also aware that heretofore an arm has been secured beneath the door, having a stud adjustably secured thereto provided with a suitable bearing for engaging and guiding the bottom of the door.

I claim as my invention.

The bracket formed of one piece of strap metal bent at the middle, and having arms parallel for a short distance from the outer end, and then diverging, in combination with the roller, the bolt, and means for clamping the bolt to the edges of the parallel arms, substantially as described.

In testimony whereof I have signed my name to this specification in the presence of two subscribing witnesses.

WILLIAM J. LANE.

Witnesses:
E. M. MEEKS,
J. W. RUST.